United States Patent
Hogarth et al.

(10) Patent No.: US 7,434,453 B2
(45) Date of Patent: Oct. 14, 2008

(54) VACUUM-ASSISTED FIXTURE FOR HOLDING A PART

(75) Inventors: Eric H. Hogarth, Pittsford, VT (US); Bruce W. Holt, Fair Haven, VT (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 11/177,452

(22) Filed: Jul. 8, 2005

(65) Prior Publication Data

US 2007/0007733 A1    Jan. 11, 2007

(51) Int. Cl.
*G01M 15/00* (2006.01)
(52) U.S. Cl. .................................................. 73/119 R
(58) Field of Classification Search .................. 73/116, 73/117.2, 117.3, 117.4, 118.1, 119 R
See application file for complete search history.

(56) References Cited

U.S. PATENT DOCUMENTS

| 3,884,061 | A | * | 5/1975 | Westby ........................... 72/38 |
| 4,561,642 | A | * | 12/1985 | Parque ......................... 269/21 |
| 4,597,228 | A | * | 7/1986 | Koyama et al. ............. 451/388 |
| 4,718,629 | A | * | 1/1988 | Block et al. ................. 248/363 |
| 4,830,485 | A |   | 5/1989 | Penney et al. |
| 4,906,011 | A |   | 3/1990 | Hiyamizu et al. |
| 5,048,804 | A | * | 9/1991 | Ito ................................ 269/21 |
| 5,374,021 | A | * | 12/1994 | Kleinman .................... 248/362 |
| 5,572,786 | A | * | 11/1996 | Rensch .......................... 29/559 |
| 6,364,299 | B1 | * | 4/2002 | Schmalz et al. ............... 269/21 |
| 6,938,649 | B2 | * | 9/2005 | Nakazawa ...................... 141/7 |
| 7,127,825 | B2 | * | 10/2006 | McMurtry et al. ............. 33/556 |
| 7,225,531 | B2 | * | 6/2007 | Hwang ......................... 29/739 |
| 7,309,204 | B2 | * | 12/2007 | Dorner et al. ............... 414/737 |
| 2003/0025259 | A1 | * | 2/2003 | Nesbit .......................... 269/21 |
| 2003/0106574 | A1 | * | 6/2003 | Krolak ........................ 134/137 |

* cited by examiner

*Primary Examiner*—Eric S McCall
(74) *Attorney, Agent, or Firm*—Adams Intellectual Property Law, P.A.; William Scott Andes, Esq.

(57) ABSTRACT

An inspection fixture, including a manifold having an inlet opening and an outlet opening for communicating with a negative pressure source for producing a vacuum within the manifold. A part collet is provided for being positioned in the inlet opening and held in place by a vacuum exerted on a downstream side of the collet. The part collet includes a part holder opening communicating with the manifold for exerting a vacuum on a downstream side of a part positioned in the part holder opening for inspection. The part collet may be quickly and accurately installed in and removed from the manifold by breaking the vacuum on the downstream side of the collet. The part may also be quickly and accurately installed in and removed from the part collet by breaking the vacuum hold on the downstream side of the part.

18 Claims, 17 Drawing Sheets

US 7,434,453 B2

VACUUM-ASSISTED FIXTURE FOR HOLDING A PART

TECHNICAL FIELD AND BACKGROUND OF THE INVENTION

This invention relates to a vacuum-assisted fixture for holding a part during a process being carried out on the part. The particular embodiment of the fixture described in this application relates to a fixture for holding a turbine engine blade during an inspection process on a "light gauge." This inspection process involves the use of optical triangulation on a set of 2D points generated by a light pattern. In this process, a light pattern is directed on the object being inspected and software interprets the reflected light and converts it to a measurement that is compared with a standard in order to determine whether the blade has been manufactured within required tolerances.

Prior art inspection fixtures utilized as above have required a separate, complex fixture and calibration artifact for each blade stage, resulting in great expense and difficulty in production line coordination. Loading and unloading of blades in these fixtures is difficult, requiring careful insertion of the blade using both hands. Repeatability within required tolerances was therefore operator dependent. Accordingly, there is a need for a simple, repeatable, economical and highly accurate substitute for these prior art fixtures.

In addition, the fixture described and claimed has application in other manufacturing and inspection operations, for example, laser-scanning CMM (coordinate measuring machine) instruments, optical gauging, and coating processes.

BRIEF DESCRIPTION OF THE INVENTION

Therefore, the present invention provides an apparatus and method for holding a part, such as a turbine engine blade, during inspection. The use of a vacuum-assisted part holder enables the parts to be easily and accurately inserted into the fixture and removed with equal ease and accuracy. Parts having different shapes or other characteristics can be inserted by using holders having uniquely-shaped openings that will accept on a particular type of part. Vacuum-assist is also used to retain the holders in a precise position while permitting quick and accurate removal and replacement when needed.

In accordance with one aspect of the invention, the fixture includes a base, and a manifold mounted on the base. The manifold defines an inlet opening and an outlet opening for communicating with a negative pressure source for producing a vacuum within the manifold. A part collet is provided for being positioned in the inlet opening and held in place by a vacuum exerted on a downstream side of the collet. The collet includes a part holder opening therein communicating with the manifold for exerting a vacuum on a downstream side of a part positioned in the part holder opening for inspection. Registration means are provided for maintaining a predetermined orientation of the collet in relation to the manifold and the part. The part collet may therefore be quickly and accurately installed in and removed from the manifold by breaking the vacuum hold on the downstream side of the collet. The part itself may also be quickly and accurately installed in and removed from the part collet by breaking the vacuum hold on the downstream side of the part.

According to another aspect of the invention, the manifold is mounted for rotation on the base.

According to yet another aspect of the invention, a calibration artifact collet for being positioned in a predetermined position in the opening for calibrating the inspection fixture.

According to yet another aspect of the invention, the part comprises a turbine blade, and the fixture includes a plurality of collets. The blade holder opening of a one of the plurality of collets has a shape unique to a single type of blade to be inspected, and the downstream side of the blade has a complementary unique shape corresponding to the unique shape of the opening of the collet. Thus, only a single type of blade is properly positionable in a corresponding unique-shaped opening of the collet.

BRIEF DESCRIPTION OF THE DRAWINGS

Some aspects of the invention have been set forth above. Other aspects of the invention will appear taken in conjunction with the following drawings, in which.

DESCRIPTION OF THE PREFERRED EMBODIMENT AND BEST MODE

Figure 1:
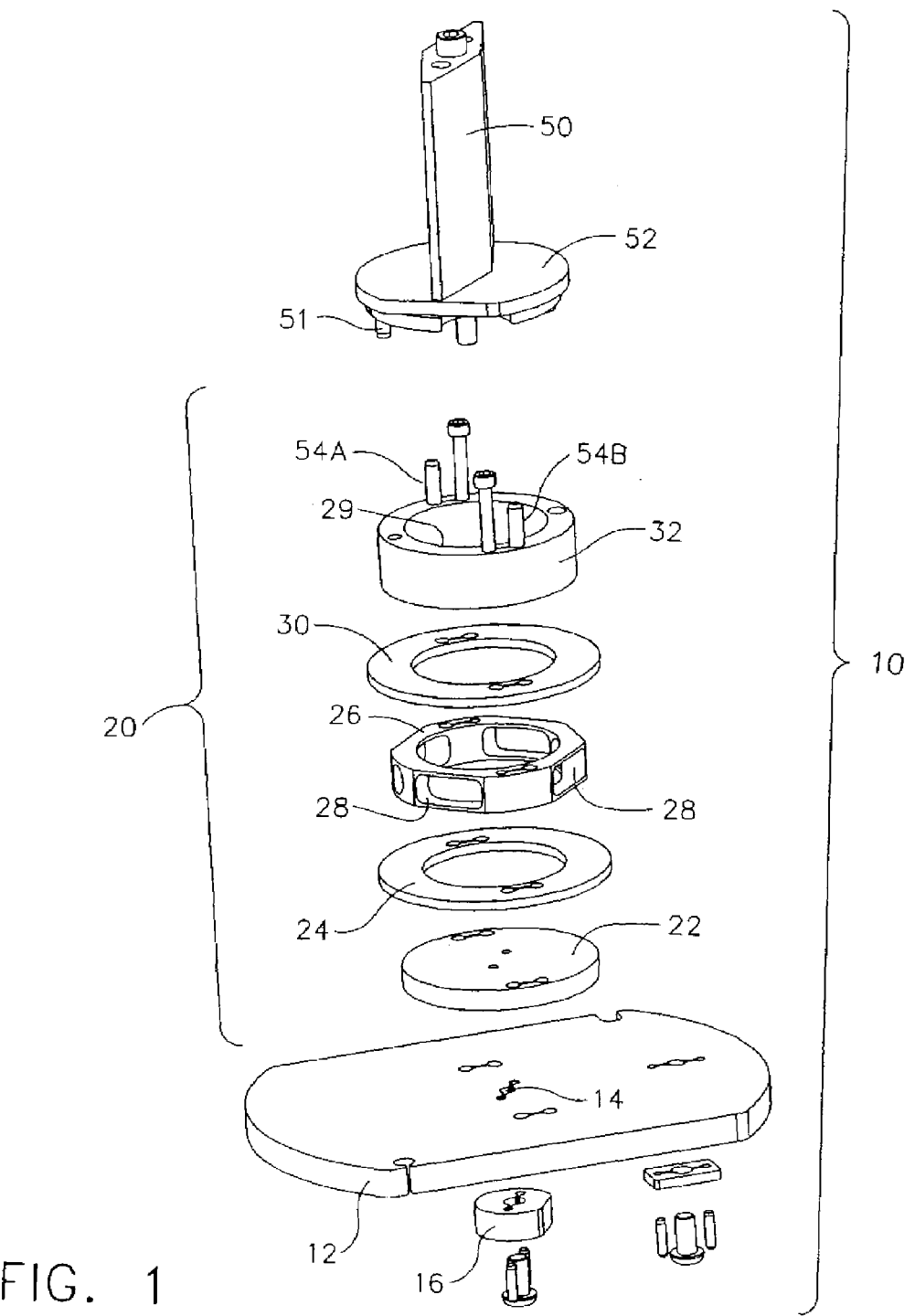
FIG. 1 is an exploded view of the base and rotating manifold assembly of the fixture.
Figure 2:
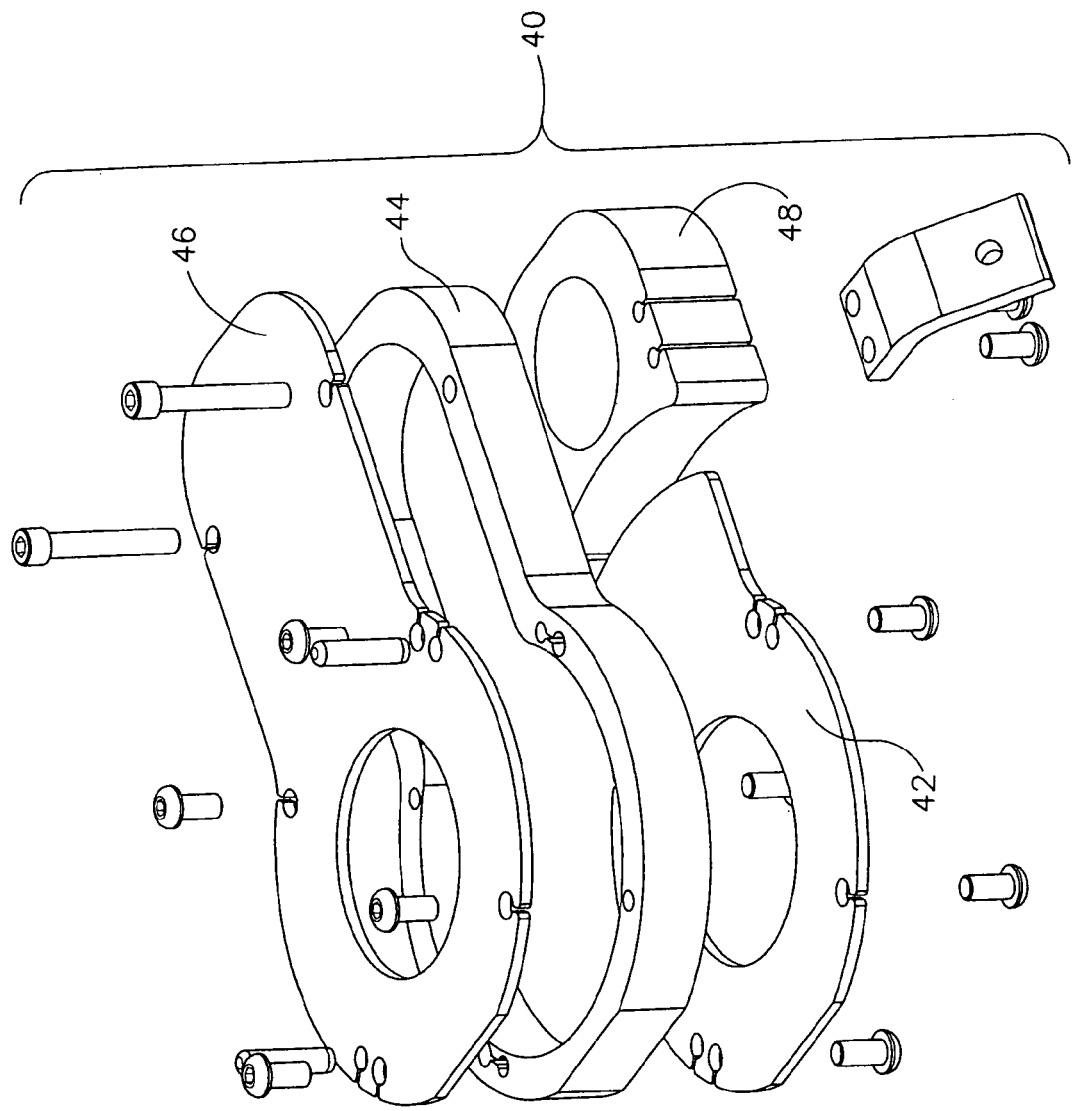
FIG. 2 is an exploded view of the stationary manifold assembly of the fixture.
Figure 3:
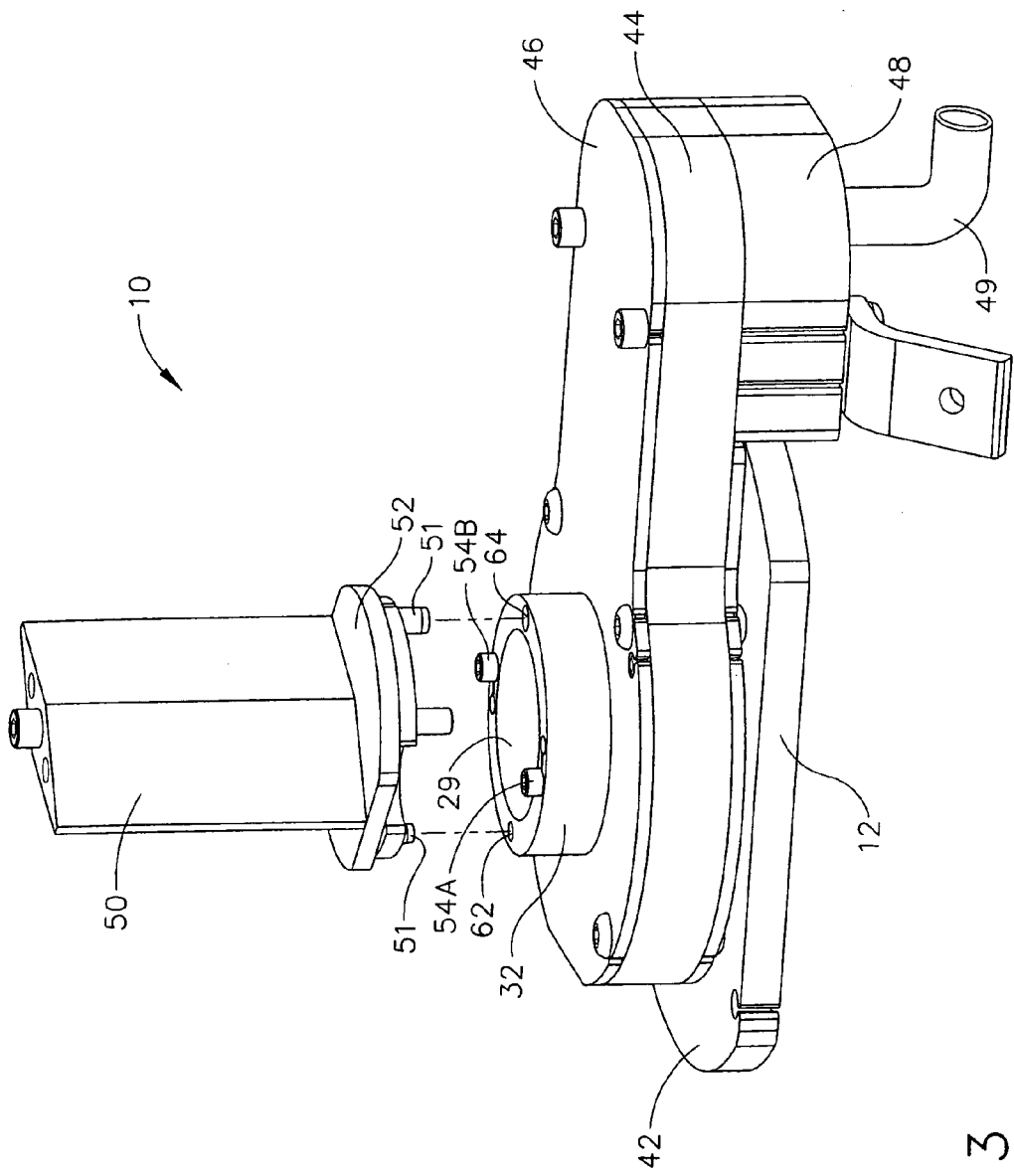
FIG. 3 is a partially-exploded perspective view of the assembled fixture.

Referring now specifically to the drawings, a vacuum-assisted fixture for holding a part according to the present invention is illustrated in FIGS. 1, 2 and 3, and shown generally at reference numeral 10 of FIG. 1. The fixture includes a base 12 having a central, vertically-extending bore 14 therethrough for receiving a center pin assembly 16. A rotating manifold assembly 20 is positioned on the center pin assembly 16 for rotation. The rotating manifold assembly 20 includes a concentrically-positioned bottom slip 22, bottom ride 24, internal manifold 26 having openings 28 spaced around its axially-extending side walls, top ride 30 and top slip 32. The openings 28 communicate through the side walls with the interior of the top slip 32 and form air passages. The open center of the top slip 32 forms an inlet 29 that receives a part, as described below. A vacuum is exerted against a bottom, downstream side of the part when properly positioned in the inlet 29.

A stationary manifold assembly 40 is positioned over the rotating interior manifold assembly 20. The stationary manifold assembly 40 includes a bottom manifold cover 42, an external manifold 44 and a top manifold cover 46 suitably connected together, as by bolts, and mounted on the base 12. A hose connector 48 communicates with the manifold assembly 40 and includes threads or other suitable connector means (not shown) by which a hose 49 from a pump is attached for air flow communication to the stationary manifold assembly 40.

Referring now particularly to FIG. 3, the fixture 10 is adapted to mount a calibration artifact 50, which includes a collet 52 onto which the calibration artifact 50 is secured. As used in this application, the term "calibration artifact" refers to a device of known size and shape used to calibrate the light gauge with which the fixture 10 is used. The light gauge calibrates itself by measuring the calibration artifact 50 and comparing the measurements against an internal known standard. Any adjustments necessary to bring the light gauge into proper calibration are then made by the light gauge software and the light gauge is then ready to be used in a production inspection process. As noted above, use of the fixture 10 is also applicable in other processes where accurate positioning and the ability to quickly remove and replace parts of the fixture or part is necessary.

Figure 4:
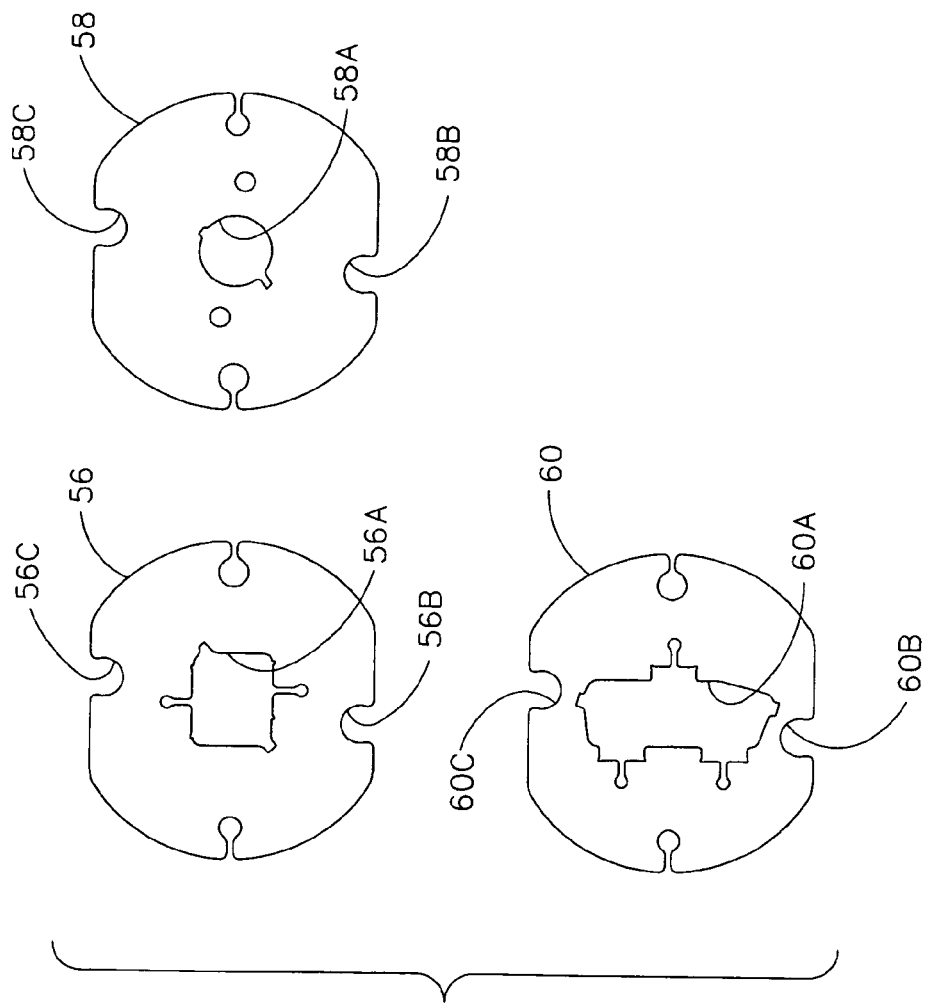
FIG. 4 are plan views of three collets having unique opening shapes for receiving different blade configurations.

The calibration artifact 50 and the attached collet 52 are positioned onto the top slip 32 and is held in place by a vacuum being exerted on the bottom, downstream side of the collet 52. The top slip 32 receives a selected one of the collets part 56, 58 or 60 shown in FIG. 4. The part collets 56, 58, 60 have uniquely-shaped part holder openings 56A, 58A, 60A that are adapted to receive only a single type, shape or configuration of a part, such as a turbine engine blade, to be inspected. The collets 56, 58, 60 include respective peripheral notches 56B, 56C, 58B, 58C, and 60B, 60C, that cooperate with registration pins 54A, 54B positioned on the top, radially-extending surface of the top slip 32 to lock the collets 56, 58, 60 into a fixed position. Pins 51 on the bottom of the collets 56, 58 60 fit into registration holes 62, 64 on the top surface of the top slip 32 to further lock the elements together. The collets 56, 58 60 may be quickly and easily removed and replaced by lifting the collet 56, 58 or 60 upwardly off of the top slip 32 against the pull of the vacuum.

Calibration

Figure 5:
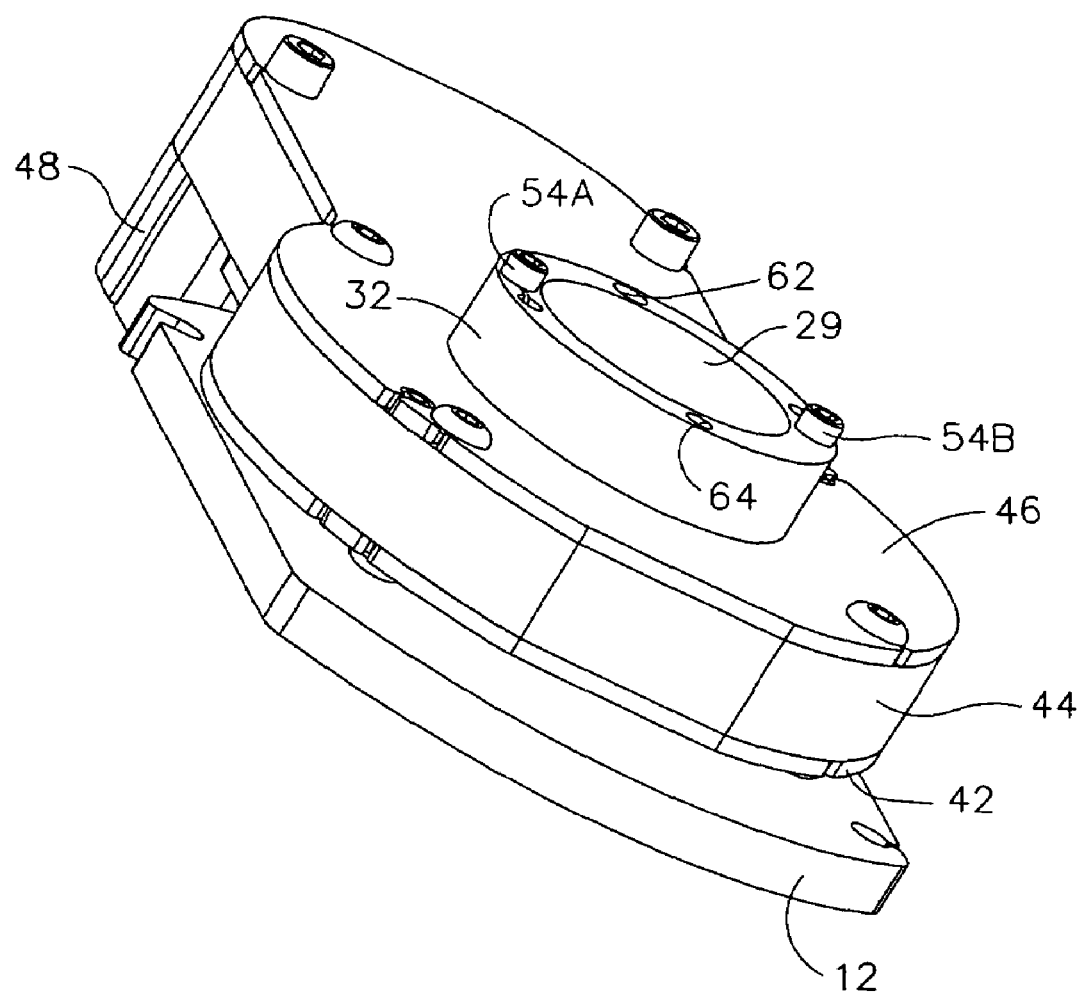
FIG. 5 is a perspective view of the inspection fixture ready to receive a calibration artifact or part collet.
Figure 6:
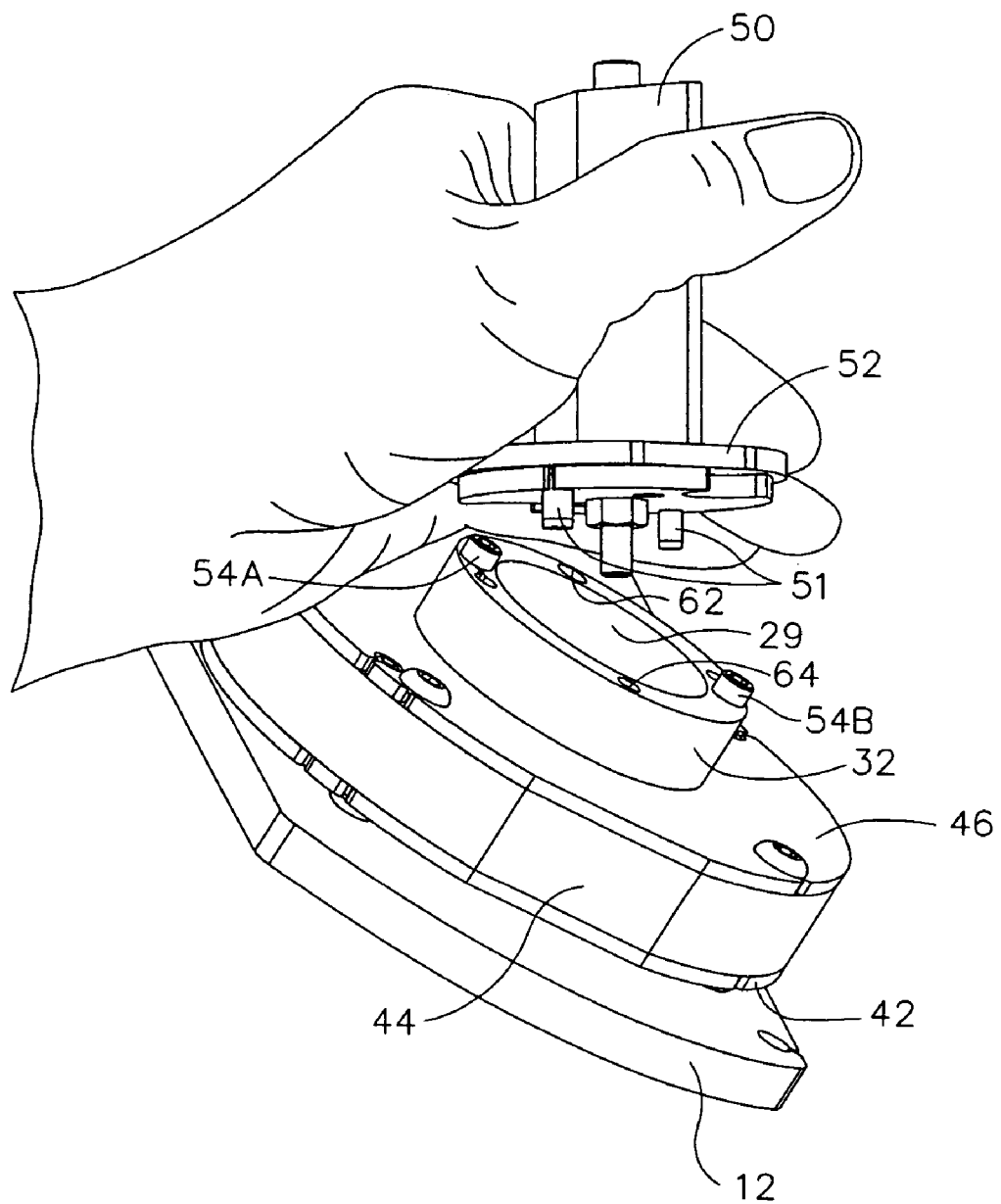
FIGS. 6 and 7 show the loading of a calibration artifact onto the fixture.
Figure 7:
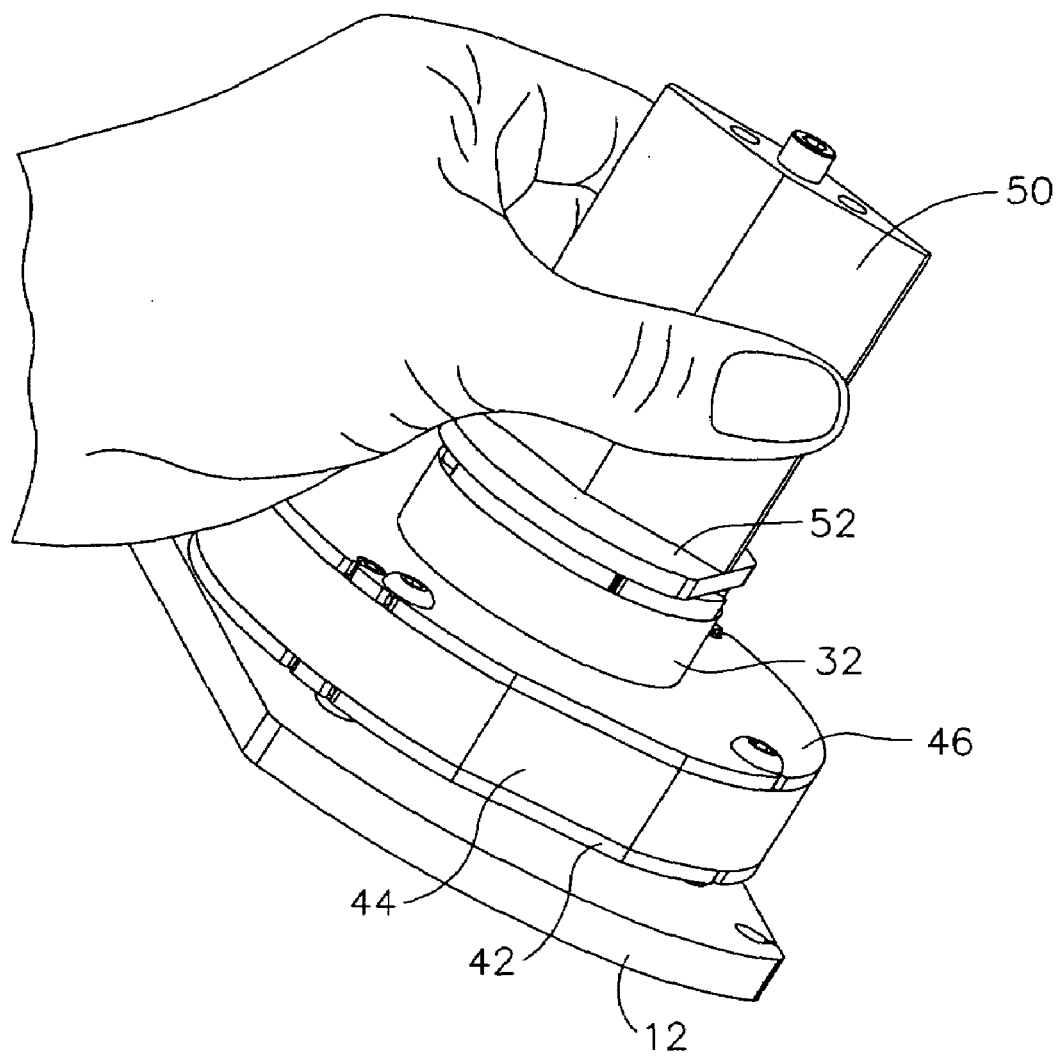
Figure 8:
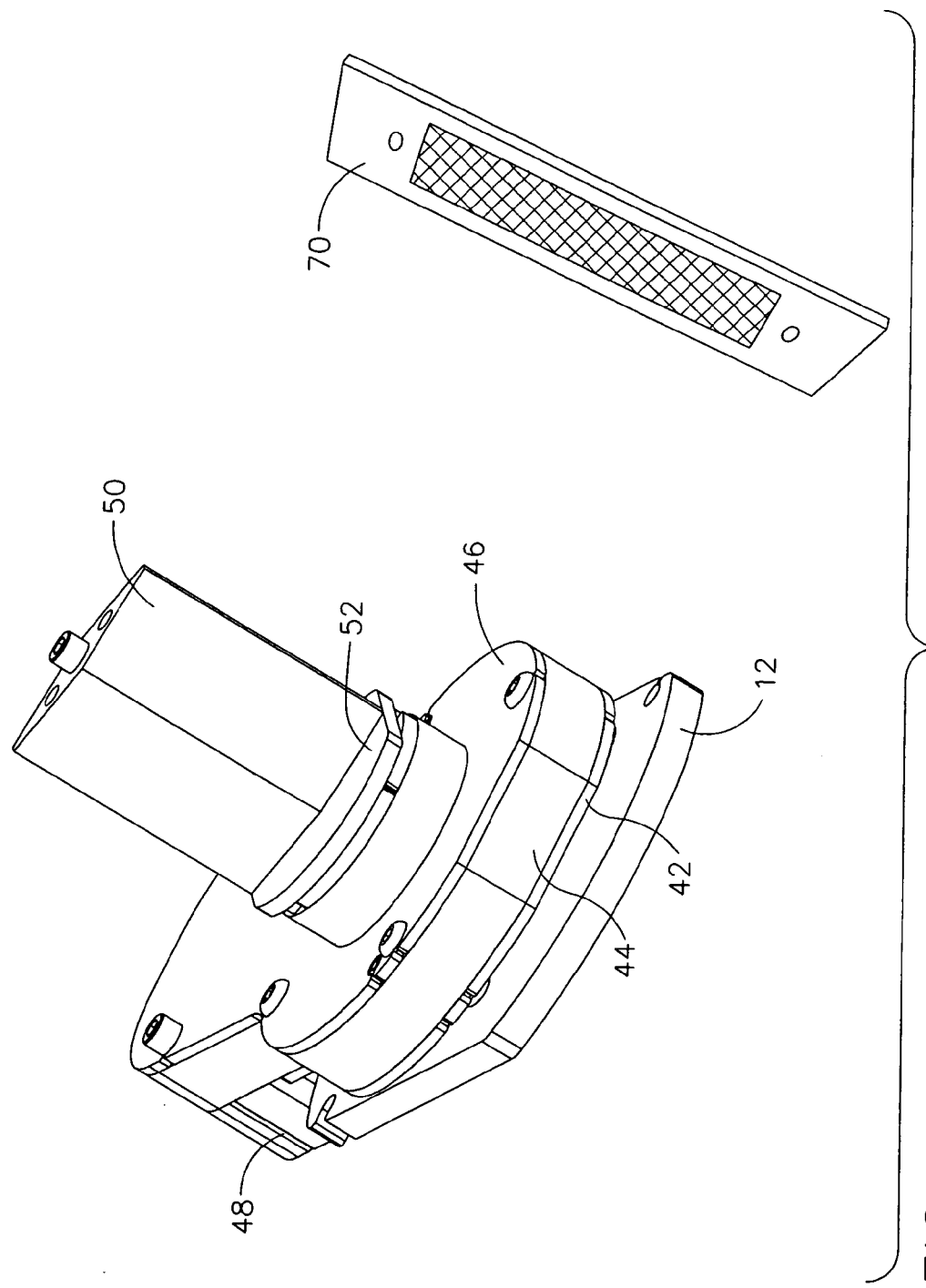
FIG. 8 shows the calibration fixture properly loaded onto the fixture.
Figure 9:
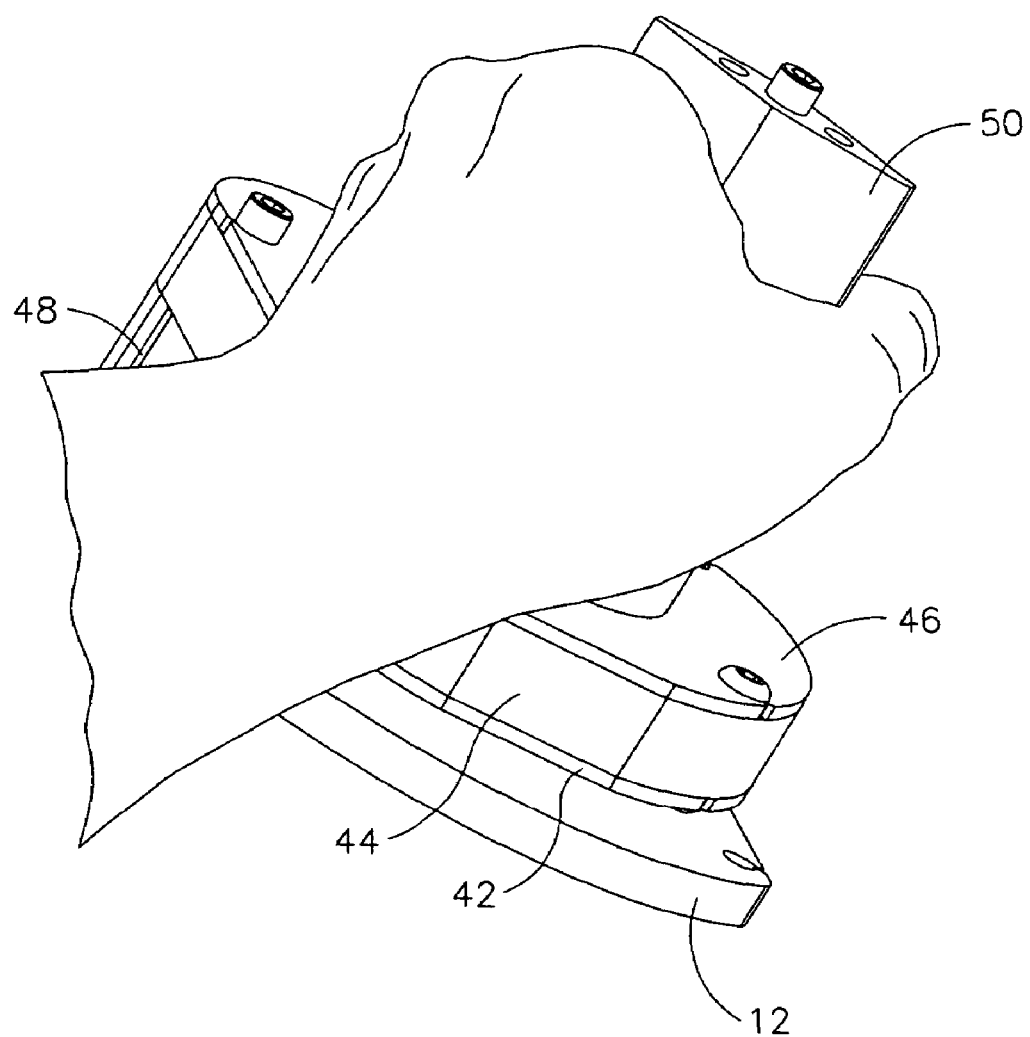
FIG. 9 shows removal of the calibration artifact from the fixture.

Use of the fixture in an illustrative preferred manner is now explained with reference to FIGS. 5-17. FIG. 5 illustrates the fixture in a condition to receive either a calibration artifact or part collet. The vacuum pump is switched "on", creating suction at the inlet 29. The calibration artifact 50 is guided towards the inlet 29, as shown in FIG. 6, aligning the pins 51 of the calibration artifact collet 52 with the registration holes 62, 64 in the top of the top slip 32. As it approaches the inlet 29, the vacuum sucks the properly-aligned collet 52 of the calibration artifact 50 into place on the top slip 32, as shown in FIG. 7. The vacuum holds the calibration artifact 50 firmly in place. The light gauge 70 is activated and calibration takes place. See FIG. 8. As is shown in FIG. 9, after calibration is completed, the calibration artifact 50 is removed by grasping it and firmly withdrawing it from contact with the top slip 32, breaking the vacuum, without the need to operate any mechanical clamps.

Preparation for Part Inspection

Figure 10:
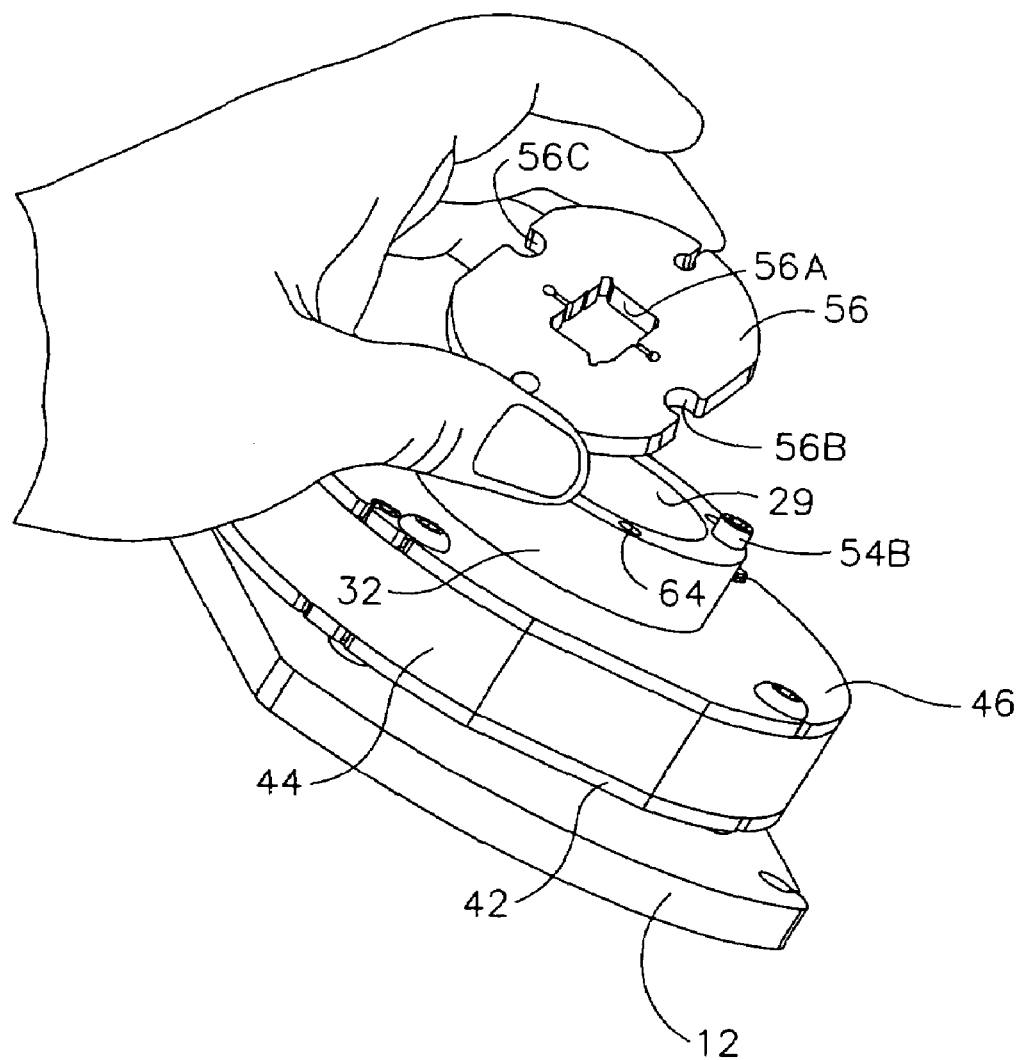
FIGS. 10 and 11 show the placement of a part collet onto the fixture.
Figure 11:
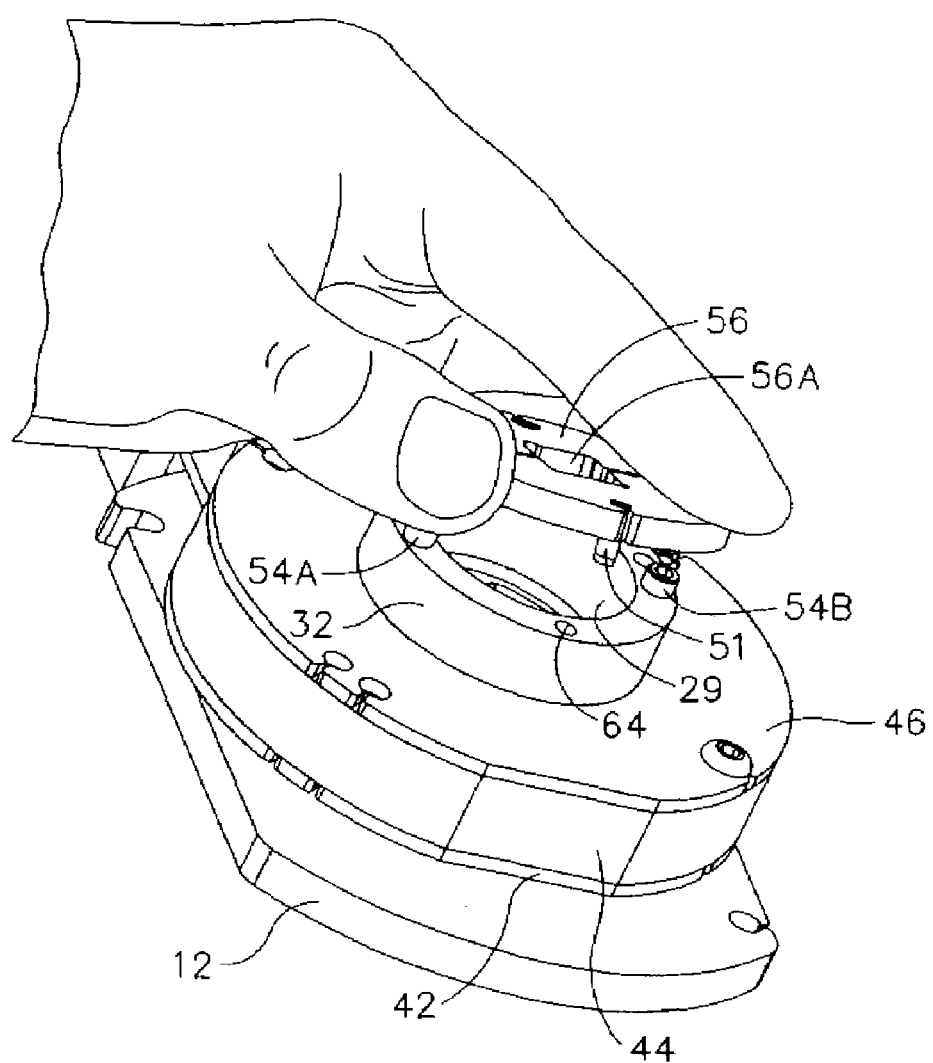
Figure 12:
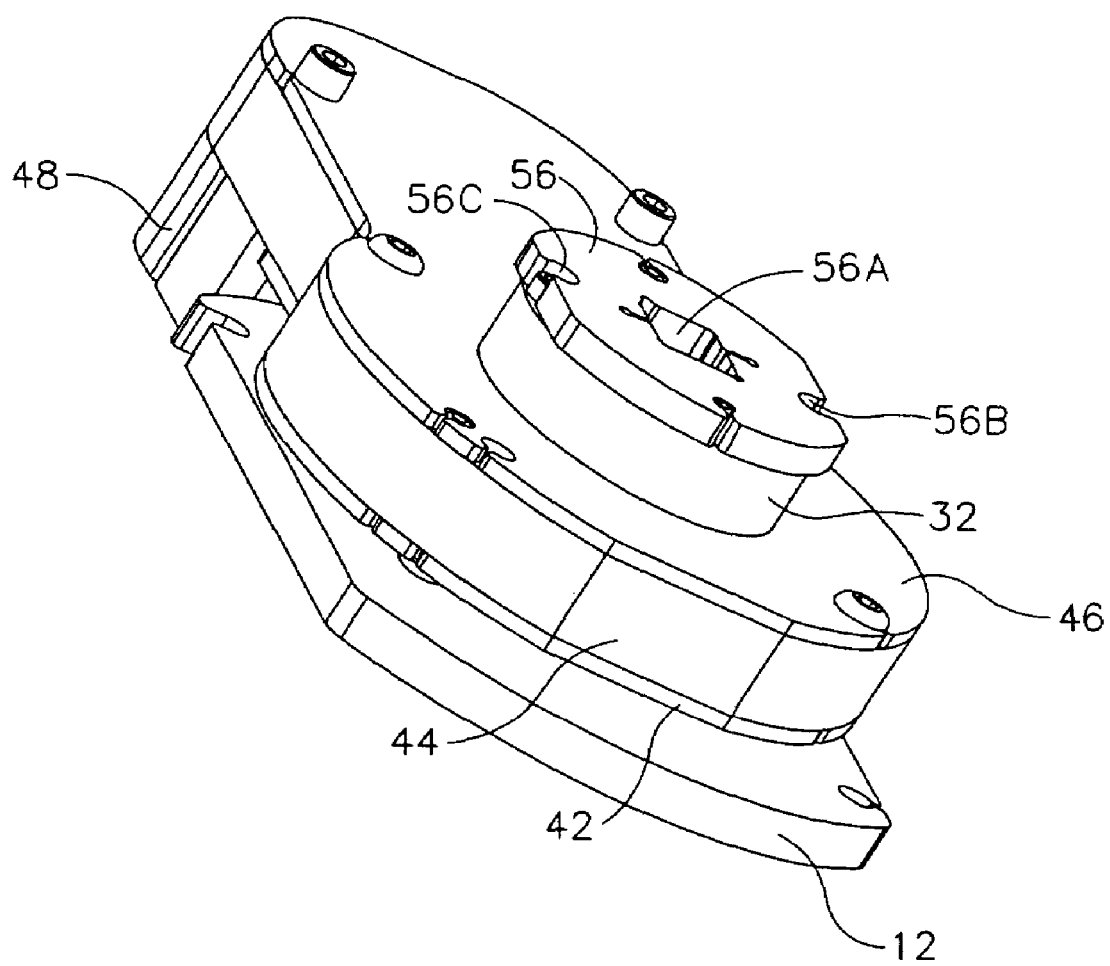
FIG. 12 shows the collet properly loaded onto the fixture and the fixture ready for the inspection process.
Figure 13:
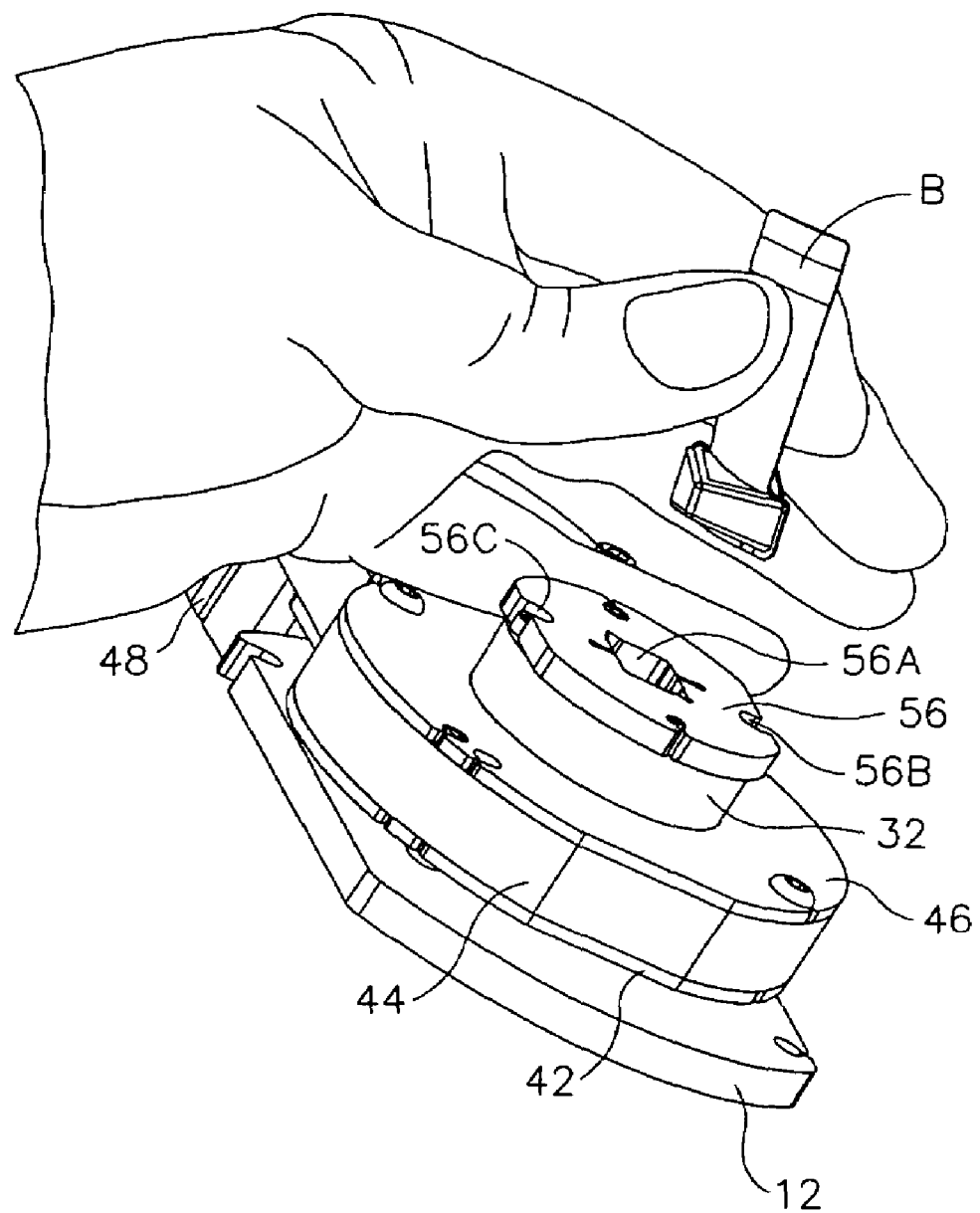
FIGS. 13-16 show the fixture receiving a blade for inspection by the light gauge.
Figure 14:
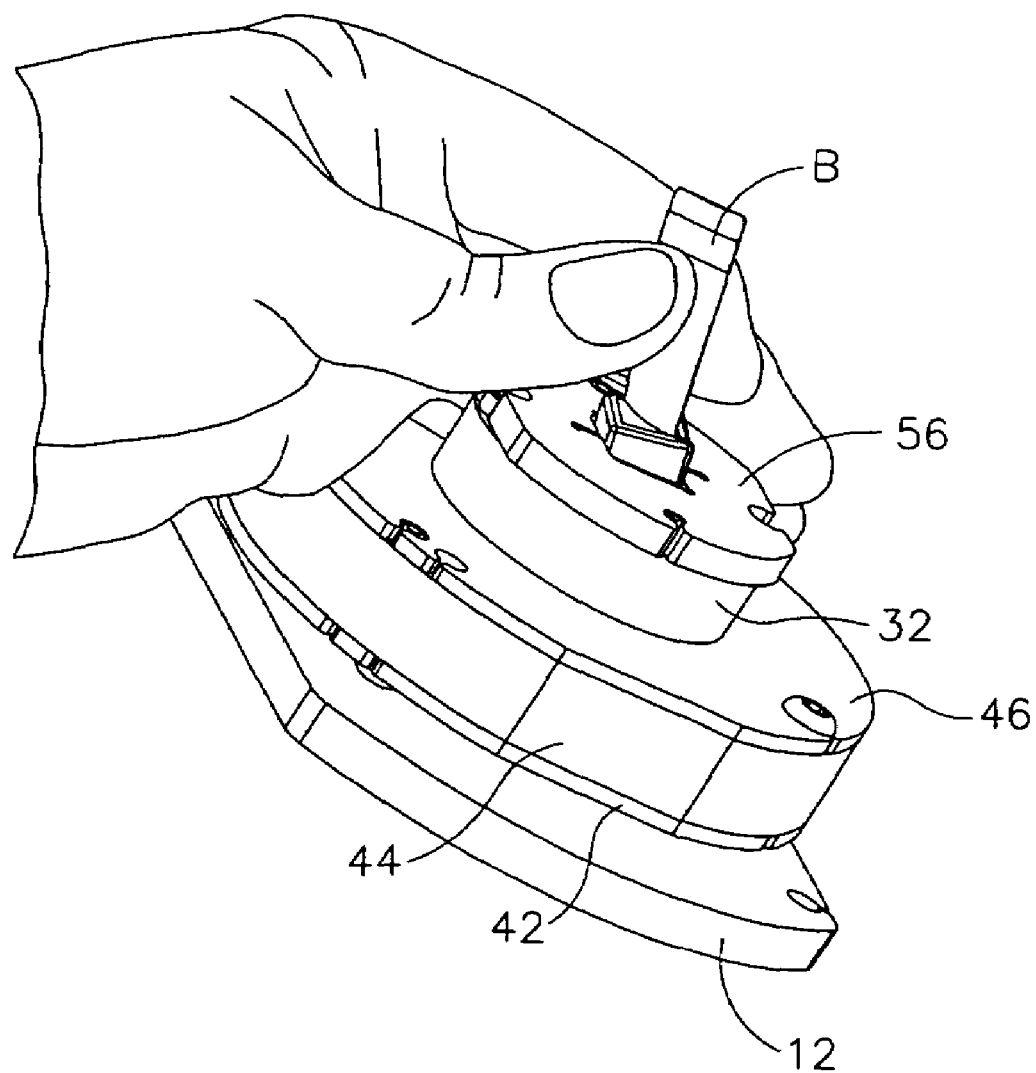
Figure 15:
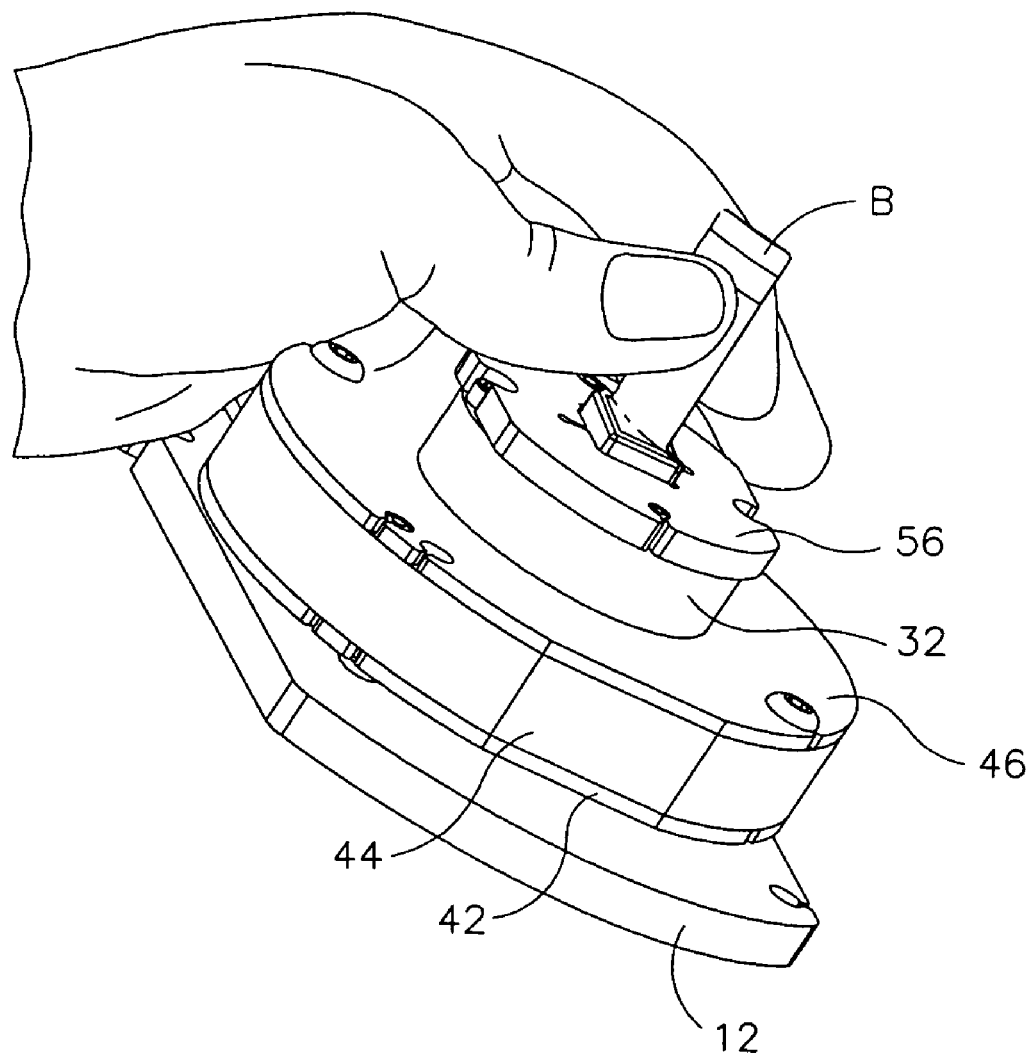
Figure 16:
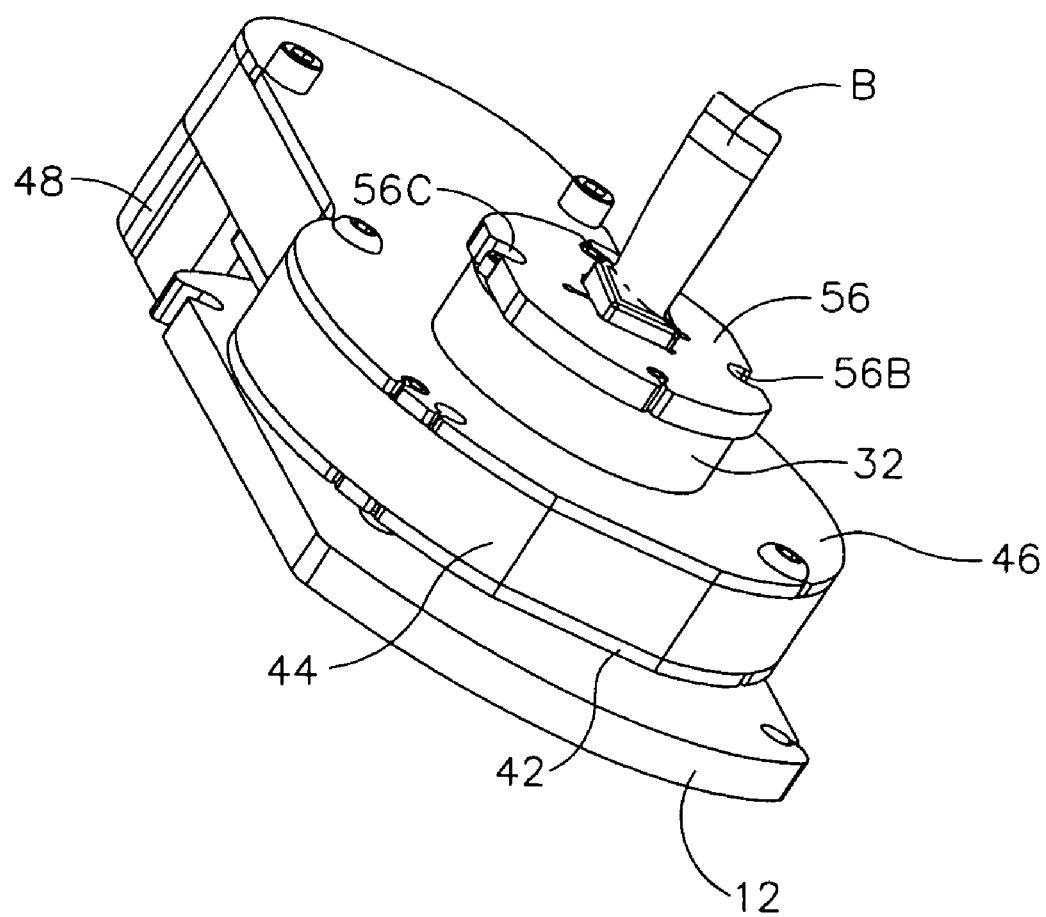

As noted above, FIG. 5 shows the fixture 10 without the calibration artifact 50 and without a collet in place. One of the collets 56, 58 or 60, collet 56 being shown, is then loaded onto the top slip 32, as shown in FIG. 10. As the collet 56 approaches the top slip 32, it is aligned by the operator so that the registration pins 54A, 54B of the top slip 32 are aligned with the notches 56B, 56C in the edge of the collet 56. The pins 51 on the bottom surface of the collet 56 are positioned in the holes 62, 64 in the top of the top slip 32. See FIG. 11. As the collet 56 approaches the inlet 29, it is sucked into place by the vacuum, as is shown in FIG. 12. The fixture 10 is now ready to accept a part for inspection.

With the collet 56 properly in place, it is being held in a fixed, aligned position by the vacuum, while air is now being pulled through the opening 56A in the collet 56, as is shown in FIG. 12. FIGS. 13-16 illustrate that a blade "B" to be inspected is moved towards the opening 56A in the collet 56, while aligning the shape of the base of the blade "B" to the complementary shape of the opening 56A in collet 56. As the aligned blade "B" approaches the opening 56A, it is sucked down into place. The blade "B" is firmly held in the precisely correct inspection position and is therefore ready for the inspection process.

Figure 17:
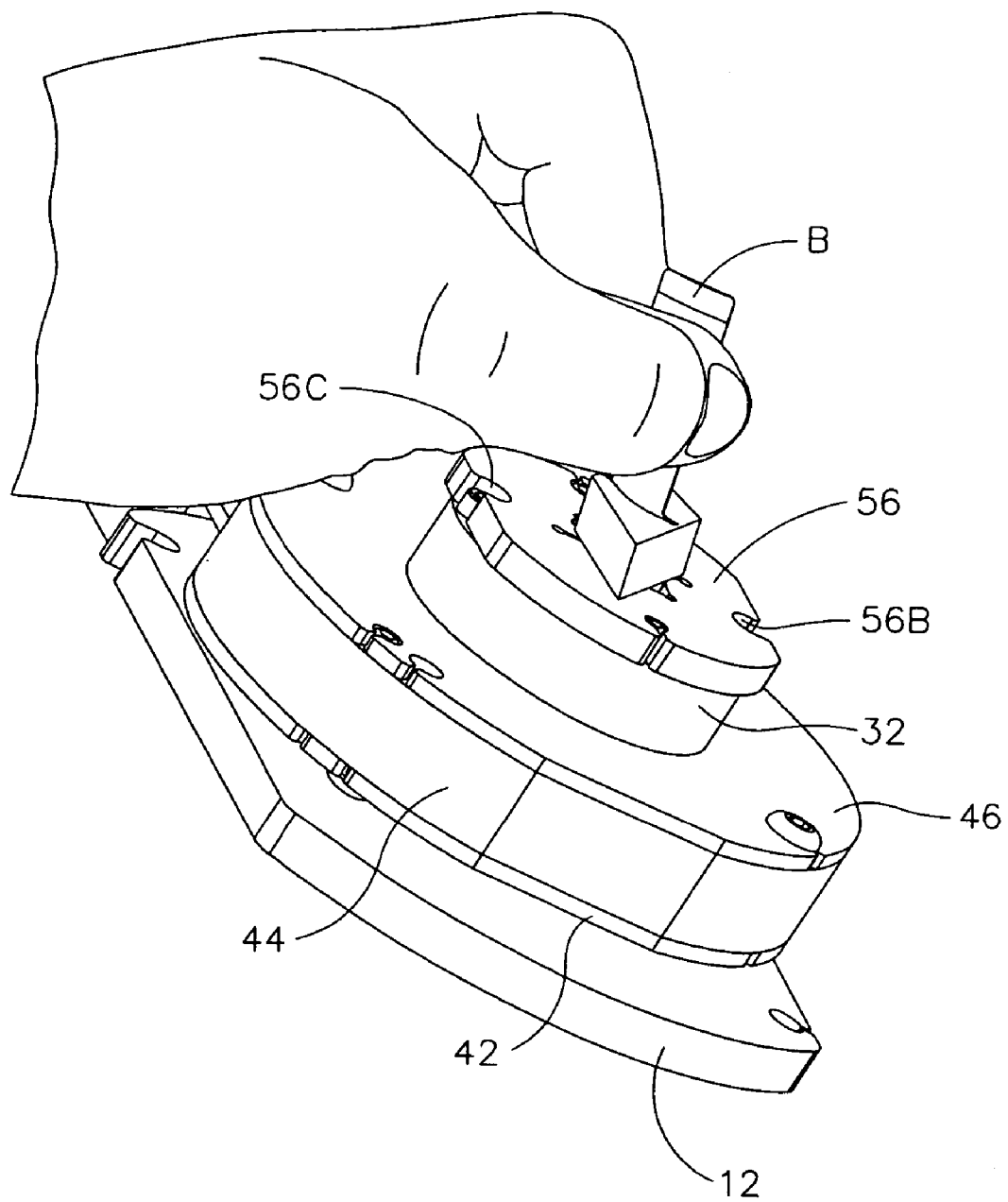
FIG. 17 illustrates that the blade cannot be loaded in any other than the correct orientation.

By reference to FIG. 17, is it observed that the blade "B" cannot be loaded in any other orientation because the shape of the opening 56A will not then match the shape of the blade "B". When properly positioned, the blade "B" can be rotated as needed to carry out the inspection by rotating the interior manifold assembly 20 relative to the stationary manifold assembly 40.

After the blade "B" has been inspected, it is removed merely by grasping it and pulling it out of the opening 56A in the collet 56 against the vacuum being applied to the downstream side. The operator has only to overcome the force of the vacuum without further manipulation of the blade "B", and without operating mechanical clamps. Successive blades "B" are inspected in the same manner as described above.

Inspection of a different blade requires only that the collet 56 be removed and replaced with the appropriate collet, for example, collet 58 or 60. This is accomplished by grasping the collet 56 and pulling it away from the top slip 32 against the force of the vacuum. The collet 56 is then replaced with the collet 58 or 60 in the manner described above, and the corresponding blade is ready for inspection.

A vacuum-assisted fixture for holding a part is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A vacuum-assisted fixture for holding a part, comprising:
   (a) a base;
   (b) a manifold mounted on the base, the manifold defining an inlet opening and an outlet opening for communicating with a negative pressure source for producing a vacuum within the manifold;
   (c) a part collet for being positioned in the inlet opening and held in place by a vacuum exerted on a downstream side of the collet, the collet including a part holder opening therein communicating with the manifold for exerting a vacuum on a downstream side of a part positioned in the part holder opening for inspection; and
   (d) registration means for maintaining a predetermined orientation of the collet in relation to the manifold and the part;
   whereby the part collet may be quickly and accurately installed in and removed from the manifold by breaking the vacuum hold on the downstream side of the collet, and the part may be quickly and accurately installed in and removed from the part collet by breaking the vacuum hold on the downstream side of the part.

2. A vacuum-assisted fixture according to claim 1, wherein the manifold is mounted for rotation on the base.

3. A vacuum-assisted fixture according to claim 1, and including a calibration artifact collet for being positioned in a predetermined position in the opening for calibrating the inspection fixture.

4. A vacuum-assisted fixture according to claim 1, wherein the registration means comprises a complementary notch and pin positioned on respective ones of the manifold and collet for locking the manifold and collet into a fixed rotational orientation with respect to each other.

5. A vacuum-assisted fixture according to claim 1, wherein the fixture comprises a light gauge inspection fixture.

6. A vacuum-assisted fixture according to claim 5, wherein the part comprises a turbine blade.

7. A vacuum-assisted fixture according to claim 5, including a plurality of part collets, and wherein the part holder opening of a one of the plurality of part collets has a shape unique to a single type of blade to be inspected, and the downstream side of the blade has a complementary unique shape corresponding to the unique shape of the part holder opening of the part collet, whereby only a single type of blade is properly positionable in the part holder opening of the collet.

8. A vacuum-assisted light gauge inspection fixture for holding a turbine blade during inspection, comprising:
    (a) a base;
    (b) a manifold mounted for rotation on the base, the manifold defining an inlet opening and an outlet opening for communicating with a negative pressure source for producing a vacuum within the manifold;
    (c) a blade collet for being positioned in the inlet opening of the manifold and held in place by the vacuum exerted on a downstream side of the blade collet, the blade collet including a blade holder opening therein communicating with the manifold for exerting a vacuum on a downstream side of the blade positioned in the blade holder opening for inspection; and
    (d) registration means for maintaining a predetermined orientation of the blade collet in relation to the manifold and the blade,
    whereby the blade collet may be quickly and accurately installed in and removed from the manifold by breaking the vacuum hold on the downstream side of the blade collet, and the blade may be quickly and accurately installed in and removed from the blade collet by breaking the vacuum hold on the downstream side of the blade.

9. A vacuum-assisted inspection fixture according to claim 8, and including a calibration artifact collet for being positioned in a predetermined position in the opening for calibrating the inspection fixture.

10. A vacuum-assisted inspection fixture according to claim 8, including a plurality of blade collets, and wherein the part holder opening of a one of the plurality of blade collets has a shape unique to a single type of blade to be inspected, and the blade has a complementary unique shape corresponding to the unique shape of the opening of the blade collet, whereby only a single type of blade is positionable in the blade opening of the collet.

11. A vacuum-assisted inspection fixture according to claim 8, wherein the registration means comprises a complementary hole and pin positioned on respective ones of the manifold and collet for locking the manifold and collet into a fixed orientation with respect to each other.

12. A method of holding a part while a process is carried out on the part, and comprising the steps of:
    (a) providing:
        (i) a base;
        (ii) a manifold mounted on the base, the manifold defining an inlet opening and an outlet opening for communicating with a negative pressure source for producing a vacuum within the manifold;
        (iii) a part collet for being positioned in the inlet opening and held in place by a vacuum exerted on a downstream side of the collet, the part collet including a part holder opening therein communicating with the manifold for exerting a vacuum on a downstream side of a part positioned in the part holder opening for inspection; and
        (iv) registration means for maintaining a predetermined orientation of the collet in relation to the manifold and the part;
    (b) positioning the part collet in the inlet opening of the manifold where it is retained by the vacuum exerted against a downstream side thereof;
    (c) positioning a part in the part holder opening of the part collet where it is retained by the vacuum exerted against a downstream side thereof;
    (d) carrying out the process on the part;
    (e) removing the part and replacing the part with another part; and
    (f) repeating steps (b) through (e).

13. A method according to claim 12, and including the steps of:
    (a) mounting the manifold for rotation on the base; and
    (b) rotating the manifold.

14. A method according to claim 12, wherein the part comprises a turbine blade and the step of processing the part comprises the step of inspecting the turbine blade.

15. A method according to claim 12, and including the steps of:
    (a) providing a calibration artifact collet for being positioned in a predetermined position in the manifold opening; and
    (b) calibrating the fixture.

16. A method according to claim 15, wherein the fixture comprises a light gauge inspection fixture and the step of processing the part comprises the step of inspecting the part with the light gauge.

17. A method according to claim 12, wherein the part comprises a turbine blade, and the method includes the steps of:
    (a) providing a plurality of part collets, and wherein the part holder opening of a one of the plurality of part collets has a shape unique to a single type of blade to be inspected;
    (b) providing a complementary unique shape to the blade corresponding to the unique shape of the opening of the part collet, whereby only a single type of blade is positionable in the part opening of the collet;
    (c) positioning the part collet in the inlet opening of the manifold where it is retained by the vacuum exerted against a downstream side thereof;
    (d) positioning a blade in the part holder opening of the part collet where it is retained by the vacuum exerted against a downstream side thereof;
    (e) inspecting the blade;
    (f) removing the blade and replacing the blade with another blade; and
    (g) repeating steps (b) through (f).

18. A method according to claim 17, and including the steps of:
    (a) removing the part collet and replacing the part collet with a second collet having a different part holder opening shape;
    (b) positioning a second blade in the part holder opening of the second part collet having a shape complementary to the shape of the blade holder opening of the second part collet.

* * * * *